United States Patent
Edelkhani

(10) Patent No.: US 9,281,971 B1
(45) Date of Patent: Mar. 8, 2016

(54) VERTICAL EYE MARGIN MEASUREMENT USING CHANNEL RECEIVER EQUALIZER

(71) Applicant: ORACLE INTERNATIONAL CORPORATION, Redwood City, CA (US)

(72) Inventor: Nima Edelkhani, Santa Clara, CA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 0 days.

(21) Appl. No.: 14/618,279

(22) Filed: Feb. 10, 2015

(51) Int. Cl.
  *H04B 3/46* (2015.01)
  *H04L 25/03* (2006.01)
  *H04L 1/20* (2006.01)

(52) U.S. Cl.
  CPC .......... *H04L 25/03057* (2013.01); *H04L 1/203* (2013.01)

(58) Field of Classification Search
  CPC . H04L 25/03057; H04L 7/033; H04L 7/0331; H04L 2025/0349; H04L 7/0025; H04L 2025/03579; H04L 27/01; H04L 47/283; H04L 43/00; H04L 1/24; H04L 12/26; H04L 27/2271; H04L 27/2272; H04B 7/0842; H04B 17/00; H04B 3/46
  USPC .......... 375/224, 225–226, 316, 371, 354–355
  See application file for complete search history.

(56) References Cited

U.S. PATENT DOCUMENTS

| | | | | |
|---|---|---|---|---|
| 7,571,360 | B1* | 8/2009 | Lewicki | G06F 11/2215 714/704 |
| 7,613,393 | B2* | 11/2009 | Aronson | H04B 10/40 398/16 |
| 7,636,387 | B2* | 12/2009 | Yamaguchi | G01R 29/26 375/224 |
| 7,743,288 | B1* | 6/2010 | Wang | G01R 31/3171 714/703 |
| 7,769,110 | B2* | 8/2010 | Momtaz | H04L 25/061 327/175 |
| 7,773,667 | B2* | 8/2010 | Sindalovsky | G01R 31/31715 375/224 |
| 7,822,110 | B1* | 10/2010 | Doblar | H04B 3/32 375/224 |

(Continued)

*Primary Examiner* — Emmanuel Bayard
(74) *Attorney, Agent, or Firm* — Marsh Fischmann & Breyfogle LLP; Daniel J. Sherwinter

(57) ABSTRACT

Embodiments include systems and methods for determining link margins of data communications channels in a communications system. For example, an integrated circuit includes a large number of input/output (I/O) channels, each with a respective receiver system. The receiver system can include equalizer subsystems, that attempt to adapt to their respective channels (e.g., to eliminate inter-symbol interference). Embodiments manipulate filter tap weights in the equalizer subsystems to controllably close its respective data eye until a failure region is detected, indicating that a threshold I/O error rate has been exceeded. Thus, for each channel, the filter tap weights can be allowed to fully adjust to identify fully adapted values, and they can be forced into a failure region to identify failure region values. A link margin for each channel can be derived for each channel according to the difference between the fully adapted and failure region values of the filter tap weights.

20 Claims, 6 Drawing Sheets

(56) References Cited

U.S. PATENT DOCUMENTS

| | | | | |
|---|---|---|---|---|
| 8,054,876 B2 * | 11/2011 | Tsai | ............... | H03H 11/26 333/18 |
| 8,081,879 B2 * | 12/2011 | Shou | ............... | H04B 10/695 398/136 |
| 8,391,350 B2 * | 3/2013 | Chan | ............... | H04L 25/03057 375/229 |
| 8,451,883 B1 * | 5/2013 | Ding | ............... | G01R 31/3171 375/228 |
| 8,472,580 B2 * | 6/2013 | Milton | ............... | H03L 7/0807 375/316 |
| 8,494,038 B2 * | 7/2013 | Gruendler | ............... | H04B 3/30 375/219 |
| 8,536,888 B2 * | 9/2013 | Chien | ............... | G01R 31/31716 324/613 |
| 8,694,837 B1 * | 4/2014 | Qian | ............... | H04L 1/203 714/704 |
| 8,848,774 B2 * | 9/2014 | Zhong | ............... | H04L 25/03038 375/232 |
| 8,923,463 B1 * | 12/2014 | Jenkins | ............... | H04L 25/02 375/355 |
| 8,964,827 B2 * | 2/2015 | Zhong | ............... | H04L 25/03019 375/233 |
| 9,077,575 B2 * | 7/2015 | Zerbe | ............... | H04L 25/03343 |
| 9,077,593 B2 * | 7/2015 | Chaivipas | ............... | H04L 27/22 |
| 9,172,526 B1 * | 10/2015 | Malipatil | ............... | H04L 7/033 |
| 2014/0211839 A1 * | 7/2014 | Mobin | ............... | H04L 7/10 375/233 |
| 2015/0010047 A1 * | 1/2015 | Zhong | ............... | H04L 25/03057 375/233 |
| 2015/0023398 A1 * | 1/2015 | Ren | ............... | G05F 1/10 375/219 |

* cited by examiner

VERTICAL EYE MARGIN MEASUREMENT USING CHANNEL RECEIVER EQUALIZER

FIELD

Embodiments relate generally to receiver circuits, and, more particularly, to techniques for measuring vertical data eye margin using a channel receiver equalizer.

BACKGROUND

Receiver circuits, like serializer/deserializer (SERDES) circuits, are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Over time, issues with the receiver circuits (e.g., and potentially also with their respective transmitter circuits, data channels, etc.) can contribute to bit errors in decoding the received signal, which can manifest as a degradation in link health. Accordingly, it is often desirable to measure link health to ensure that input/output (I/O) functions are being reliably performed. For example, in many high-speed I/O environments, techniques are used to measure the vertical size of the opening of the "data eye" as an indicator of link health. Such measurements can indicate how close a particular link is to failing (e.g., (surpassing a certain bit error rate). One traditional approach for measuring the data eye is to attach an external oscilloscope to a data pin, but such approaches can be impractical, for example, when there are large numbers of data links, or when connecting external measurement equipment is undesirable. Another traditional approach for measuring the data eye is to add dedicated circuitry to each receiver circuit (e.g., extra offset samplers to sample the data eye at different points and construct a representation of the data eye opening), but such approaches can consume additional power and additional circuit real estate, add cost and complexity to the receiver circuit design, and have other limitations.

Often, the receiver circuits include various sub-circuits that attempt to reliably extract digital data from a received signal, which can involve sampling an analog signal to derive the digital bits (i.e., '1's and '0's). This can involve determining where bit transitions occur and what bit value to record, often in context of noisy data, small signal levels, inter-symbol interference, and other difficult conditions. Accordingly, receiver circuits typically include various types of amplifiers, analog to digital conversion sub-circuits (e.g., data slicers), clock data recovery sub-circuits (e.g., error slicers), equalizer sub-circuits (e.g., decision feedback equalization (DFE) circuits), etc.

BRIEF SUMMARY

Among other things, embodiments provide novel systems and methods for determining link margins of data communications channels in a communications system. For example, an integrated circuit includes a large number of input/output (I/O) channels, each with a respective receiver system. The receiver system can include equalizer subsystems (e.g., decision feedback equalizer (DFE) circuits), that attempt to adapt to their respective channels (e.g., to eliminate inter-symbol interference). Embodiments manipulate filter tap weights in the equalizer subsystems to controllably close its respective data eye until a failure region is detected, indicating that a threshold I/O error rate has been exceeded. Thus, for each channel, the filter tap weights can be allowed to fully adjust to identify fully adapted values, and they can be forced into a failure region to identify failure region values. A link margin for each channel can be derived for each channel according to the difference between the fully adapted and failure region values of the filter tap weights, and according to a deterministic mathematical correspondence between the change in filter tap weights and a resulting change in data eye opening height. Some implementations perform the link margin determinations using a centralized link margin analyzer coupled with many (e.g., all) receiver systems. Thus, some implementations can determine the link margins using direct, channel-specific measurements substantially without adding dedicated circuitry to each receiver system. Further, some such implementations can perform aspects of the link margin determinations in parallel across all its coupled receiver systems, thereby realizing appreciable performance gains.

According to one set of embodiments, a system is provided for determining a link margin of a data communications channel. The system includes an error measurement subsystem, a tap adjustment subsystem, and a vertical margin calculation subsystem. The error measurement subsystem operates to: inject a set of channel test data into a receiver system communicatively coupled with the data communications channel; receive a set of recovered data output from the receiver system in response to receiving the set of channel test data; and calculate a bit error rate by comparing the set of recovered data with the set of channel test data. The tap adjustment subsystem operates to adjust a set of filter tap weights of the receiver system from fully adapted values to failure region values, the fully adapted values of the set of filter tap weights corresponding to when the receiver system is fully adapted to the data communications channel, and the failure region values of the set of filter tap weights corresponding to when the calculated bit error rate for the receiver system is exceeding a predetermined error threshold for the data communications channel. The vertical margin calculation subsystem operates to calculate a vertical margin measurement for the data communications channel as a function of a difference between the fully adapted values and the failure region values of the set of filter tap weights.

According to another set of embodiments, a method is provided for determining a link margin of a data communications channel. The method includes: locking a set of filter tap weights of a receiver system to next adjustment values defined according to an adjustment protocol, the receiver system being communicatively coupled with the data communications channel, the locking being subsequent to allowing the receiver system to fully adapt to the data communications channel thereby setting the set of filter tap weights to fully adapted values, the next adjustment values being different from the fully adapted values; calculating a bit error rate by comparing a set of recovered data with a set of channel test data, the set of recovered data being output from the receiver system in response to the receiver system receiving the set of channel test data with the set of filter tap weights locked to the next adjustment values; iterating the locking and the calculating steps until the next adjustment values are failure region values, such that the calculated bit error rate for the receiver system is at least a predetermined error threshold for the data communications channel; and deriving a vertical margin measurement for the data communications channel as a function of a difference between the fully adapted values and the failure region values of the set of filter tap weights.

According to another set of embodiments, an input/output communications system is provided. The system includes: a plurality of data communications channels; a plurality of receiver systems that each operates to receive data signals over a respective one of the data communications channels coupled thereto, each receiver system comprising an equalizer subsystem; and a vertical margin analyzer, communicatively coupled with the equalizer subsystem of each receiver system. The vertical margin analyzer includes: an error measurement subsystem that operates to inject a set of channel test data into a receiver system communicatively coupled with the data communications channel, receive a set of recovered data output from the receiver system in response to receiving the set of channel test data, and calculate a bit error rate by comparing the set of recovered data with the set of channel test data; a tap adjustment subsystem that operates to adjust a set of filter tap weights of the receiver system from fully adapted values to failure region values, the fully adapted values of the set of filter tap weights corresponding to when the receiver system is fully adapted to the data communications channel, and the failure region values of the set of filter tap weights corresponding to when the calculated bit error rate for the receiver system is exceeding a predetermined error threshold for the data communications channel; and a vertical margin calculation subsystem that operates to calculate a vertical margin measurement for the data communications channel as a function of a difference between the fully adapted values and the failure region values of the set of filter tap weights.

BRIEF DESCRIPTION OF THE DRAWINGS

The present disclosure is described in conjunction with the appended figures.

Figure 1:
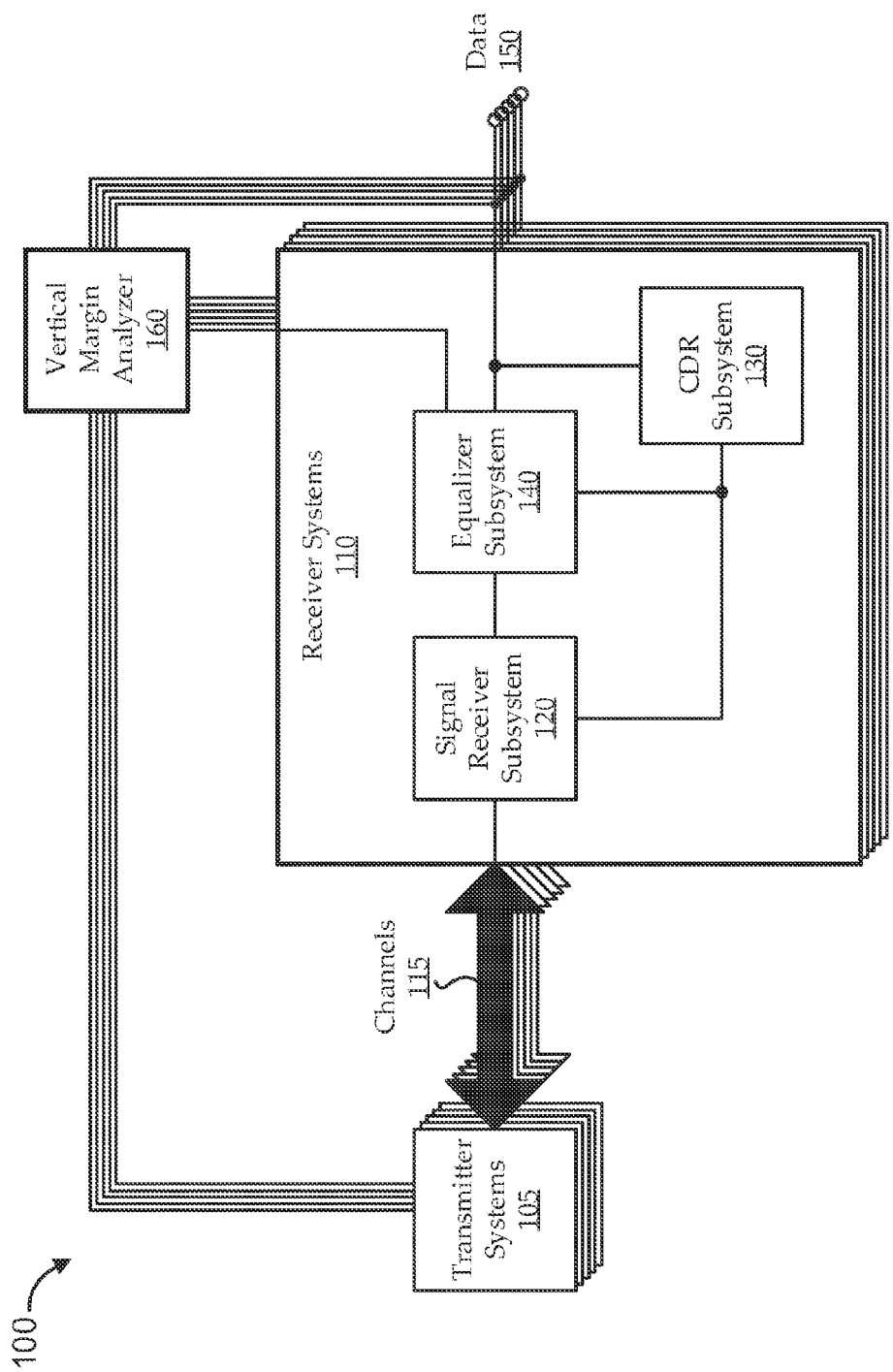
FIG. 1 shows a block diagram of an illustrative communications environment, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In many typical input/output (I/O) systems (e.g., high-speed I/O circuitry of an integrated circuit, microprocessor, or the like), data is communicated at high speeds over large numbers of data channels (e.g., thousands of data bus links). Reliable operation of such circuits can rely on reliable receipt of data over those data channels, even in context of noisy data, small signal levels, inter-symbol interference (ISI), and other difficult conditions. The ability to reliably receive data over a link can be referred to as "link health," and various techniques are often employed to measure link health in I/O circuits as an indication of a likelihood that data errors will occur.

In many high-speed I/O environments, techniques are used to measure the vertical size of the opening of the "data eye" as an indicator of link health. The data eye generally refers to a plot of a signal (typically a digital data signal from a receiver circuit), showing many data transitions overlaid on each other to manifest a combined effect of link conditions (e.g., noise, ISI, etc.) on the receiver's recovery of the data. For example, tends to permit more reliable data recovery by the receiver, which can tend to manifest as a more "open" data eye (i.e., its maximum vertical dimension is larger).

There are a number of traditional techniques for measuring the data eye opening. One traditional approach for measuring the data eye is to attach an external oscilloscope to a data pin. For example, the output of each channel's receiver can be sampled repetitively by the oscilloscope and applied to the vertical input, and the horizontal sweep can be triggered by the data rate of the receiver output signal, so that each data transition in the receiver output signal is effectively plotted on top of the preceding transitions. While such an approach can provide a direct measurement of the data eye and its opening, it has a number of limitations. One limitation is that it may be impractical to attach external measurement equipment to the outputs of each channel, particularly in environments having large numbers (e.g., thousands) of I/O links. Another limitation is that such external measurement equipment may only be available in certain environments and/or at certain stages of the manufacturing or design process for an integrated circuit (IC). Another limitation is that such approaches can involve appreciably manual setup, physical interaction with pins of a manufactured IC, and/or other undesirable actions.

Another traditional approach for measuring the data eye is to add dedicated circuitry to each receiver circuit. For example, extra offset samplers (e.g., which can include extra analog to digital converters, extra clocks, etc.) can be added to each receiver circuit to sample the data eye at different points and construct a representation of the data eye opening. While such approaches do not require external measurement equipment, they still have a number of limitations, including consuming additional power and additional circuit real estate, adding cost and complexity to the receiver circuit design, and others. For example, some such approaches dedicate approximately 1.5 percent of the silicon area of a serializer/deserializer (SERDES) IC to perform the data eye measurement, and the data eye measurement may only be used less than approximately 0.1 percent of the operational time of the IC.

Even using these and/or other traditional approaches can yield a measurement of the data eye openings of various data links, such approaches can still may not directly provide a direct measurement or indication of vertical eye margin, referred to herein as "link margin." A link margin measurement can indicate how close a particular link is to failing (e.g., (surpassing a certain bit error rate). For example, two data links can manifest the same-sized data eye opening, but one may be more sensitive than the other (e.g., if the vertical eye opening of each link degrades by five millivolts, one link may continue to reliably perform I/O functions, while the other may begin manifesting bit errors at an unacceptable rate).

Accordingly, link margin can often be a better indicator of link health than vertical eye opening size.

As described above, many traditional approaches focus on measuring vertical eye opening size, but may not provide a direct measurement of link margin. For example, some approaches can compare the measured vertical eye opening size to a predetermined threshold minimum vertical eye opening size, to the measured vertical eye opening size of a different channel that is known to be failing, to a statistical determination of a minimum threshold based on a number of known failing channels, etc. However, in any of these approaches, the compared value may not accurately reflect the true minimum for each independent channel, which can cause channels to be characterized with incorrect link margin values, channels to be overdesigned, etc.

Embodiments include systems and methods for implementing novel data link health measurement techniques by exploiting functionality already provided by many typical receiver circuits. Often, the receiver circuits include various sub-circuits that attempt to reliably extract digital data from a received signal, which can involve sampling an analog signal to derive the digital bits (i.e., '1's and '0's). This can involve determining where bit transitions occur and what bit value to record, often in context of noisy data, small signal levels, ISI, and other difficult conditions. Accordingly, receiver circuits typically include various types of amplifiers, analog to digital conversion sub-circuits (e.g., data slicers), clock data recovery sub-circuits (e.g., error slicers), equalizer sub-circuits (e.g., decision feedback equalization (DFE) circuits), etc. Embodiments can use the existing equalizer circuits of each receiver circuit (e.g., the DFE sub-circuits) to measure and manipulate the data eye opening, and thereby facilitating direct calculation of link margin, for each respective data link. Such novel approaches provide a number of features. One feature is that such approaches can directly measure link margin, not just the vertical eye opening. Another feature is that such approaches exploit existing circuitry of the receiver circuits, thereby avoiding added cost, complexity, power consumption, real estate, and/or other undesirable aspects of approaches that add dedicated circuitry for performing related functions. Another feature is that such approaches can appreciably reduce the amount of time needed to measure the link health of an IC, particular when there are large numbers of links. For example, as described below, certain implementations can measure the link margin for thousands of links in minutes, while traditional approaches would typically take days to yield similar results.

While some embodiments are described with reference to SERDES circuits and/or I/O channels of ICs, similar techniques can be applied to any suitable types of receiver circuits in any suitable signal communications environment. Further, while various embodiments are described with reference to a data eye and/or characteristics thereof (e.g., its opening, center, etc.), such references are not intended to imply or require that a data eye plot is generated. For example, some embodiments exploit deterministic relationships (e.g., a deterministic mathematical correspondence between changing tap weights and data eye opening size) to calculate link margin without ever generating a data eye plot or even without ever measuring the size of the data eye opening. Additionally, terms, like "channel," "link," "lane," and the like are all intended generally and interchangeably to refer to a data communication path.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Turning first to FIG. 1, a block diagram is shown of an illustrative communications environment 100, according to various embodiments. The communications environment 100 includes transmitter systems 105 and receiver systems 110 in communication via respective data channels 115, and at least one vertical margin analyzer 160. For example, a transmitter system 105 can include any suitable components, such as a driver, for communicating data over its respective data channel 115. Each data channel 115 can be any parallel or serial, wired or wireless, or other suitable communications channel for carrying the data. Each receiver system 110 can be implemented in any suitable manner, for example as an integrated circuit (IC) that is part of and/or in communication with microprocessors, very-large-scale integration (VLSI) circuits, communication systems, storage area networks, local area networks, wide area networks, data centers, memory components, electronic devices, memory systems, and/or computer systems (such as multiple-core processor computer systems, computer systems that include components that communicate via capacitive proximity communication, computer systems that include components that communicate via optical proximity communication, etc.).

As illustrated, each receiver system 110 can include a signal receiver subsystem 120, a clock data recovery (CDR) subsystem 130, and an equalizer subsystem 140. While the receiver system 110 is illustrated as a simplified functional block diagram to avoid overcomplicating the description and figures, these simplifications should not be construed as limiting embodiments and implementations. Each receiver system 110 can include fewer or additional components, and the various functional blocks can each be implemented as one or more discrete components, combined with other functional blocks into a single component, implemented in any suitable architecture or arrangement, etc. For example, each receiver system 110 includes any suitable components for receiving a data signal from the data channel 115 and reliably outputting data 150 as desired by other systems or components in communication with the receiver system 110.

Each signal receiver subsystem 120 can include amplifiers, filters, analog-to-digital converters, parallel or serial interface components, and/or any other suitable components for converting the received data signal from its coupled data channel 115 into a signal that can be used by other components of the receiver system 110. Each CDR subsystem 130 can implement any suitable CDR functionality, such as that of an at-rate CDR (e.g., a Muller-Mueller CDR, baud-rate, CDR, or the like). For example, each CDR subsystem 130 can seek to recover clocking information from its respective received data signal to find an optimal sampling location for reconstructing digital bit data (i.e., data 150) from the received signal.

The equalizer subsystem 140 can include a decision feedback equalizer (DFE), a linear equalizer, a feed-forward equalizer (FFE), and/or any other suitable equalization components. Some embodiments are described herein as exploiting functions of the DFE (though similar approaches could be applied to other types of equalizer components in other embodiments). In general, a DFE is a non-linear equalizer that seeks to eliminate inter-symbol interference between pulses currently being modulated and subsequent pulses (e.g., by feeding back information about previous detector decisions).

Embodiments of the vertical margin analyzer 160 can exploit functionality of the equalizer subsystems 140 of the receiver systems 110 to manipulate their respective data eye openings, thereby facilitating calculation of link margin for each respective channel 115. While the vertical margin analyzer 160 is shown as a single vertical margin analyzer 160 in communication with all receiver systems 110, it can alternatively be implemented as a subsystem (e.g., circuitry) instance within each receiver system 110, as multiple vertical margin analyzers 160 each in communication with (i.e., shared by) subsets of receiver systems 110, or in any other suitable manner. As described herein, the equalizer subsystem 140 can include weighted feedback control (e.g., weighted taps that control linear filters), and adjusting the weighted feedback control can deterministically affect the vertical size of the data eye opening for the respective receiver system 110. Embodiments of the vertical margin analyzer 160 can manipulate the weighted feedback controls of the equalizer subsystems 140 to deterministically close the data eye from a normal (i.e., fully adapted, fully open) level, while analyzing the impacts of the data eye closure on link health (e.g., bit error rate). When the link health degrades to a certain level (e.g., exceeds a threshold bit error rate), the degree of eye closure can be used to calculate the link margin of the respective channel 115. The equalizer subsystem 140 can then be allowed to resume its normal operations, thereby adapting to the channel 115 and re-opening the data eye.

Various embodiments are described and/or illustrated herein as including one or more connections between the vertical margin analyzer 160 and the receiver systems 110 and/or the transmitter systems 105. In some implementations, these connections are physical (e.g., electrical) couplings between respective devices, blocks, components, etc. In other implementations, the vertical margin analyzer 160, receiver systems 110, and/or transmitter systems 105 are in communication with a central processor or controller that handles communications between those systems (i.e., the systems communicate with each other through the central processor or controller). In other implementations, the vertical margin analyzer 160, receiver systems 110, and/or transmitter systems 105 sit, or are in communication with, a control or communications plane or layer, that facilitates communications between the systems. For example, references herein to the vertical margin analyzer 160 communicating with a receiver systems 110 can be implemented via higher-level or lower-level communications functions (e.g., of a greater integrated circuit context, etc.). In certain implementations, the vertical margin analyzer 160 is implemented as a virtual device, circuit block, algorithm, and/or other function of the central processor or controller, the control or communications plane or layer, etc.

Figure 2:
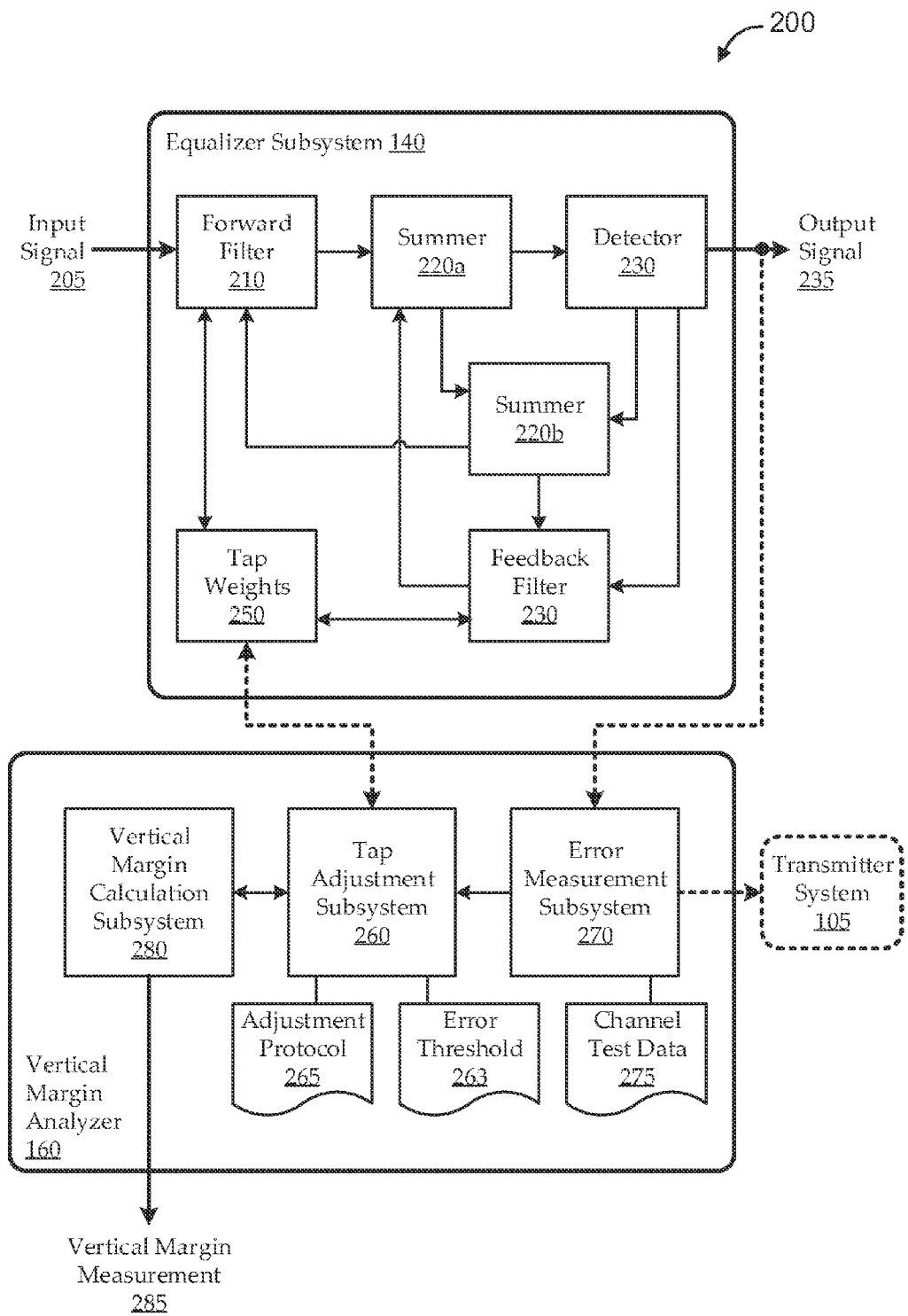
FIG. 2 shows a simplified block diagram of a portion of a communications environment, including an illustrative vertical margin analyzer in communication with an illustrative equalizer subsystem and a transmitter system, according to various embodiments.

FIG. 2 shows a simplified block diagram of a portion of a communications environment 200, including an illustrative vertical margin analyzer 160 in communication with an illustrative equalizer subsystem 140 and a transmitter system 105, according to various embodiments. The communications environment 200 can represent an implementation of the communications environment 100 described with reference to FIG. 1. A single equalizer subsystem 140 is shown to avoid overcomplicating the Figure.

The equalizer subsystem 140 is illustrated as a Decision Feedback Equalizer (DFE). As shown, the equalizer subsystem 140 includes a forward filter 210 and a feedback filter 230, which can be implemented in any suitable manner, for example, as linear filters (e.g., transversal filters). The equalizer subsystem 140 also includes a detector 230, which can be implemented in any suitable manner, as for example, as a non-linear detector configured to provide inputs to the feedback filter 230. For example, summers 220 (or similar components) can be used to extract the ISI contributed from previously detected symbols, and subtract out that interference to cancel its effect at the output of the forward filter 210. This can help the receiver to effectively "adapt" to the ISI (e.g., and/or other certain characteristics) of the channel. For example, the equalizer subsystem 140 can receive an input signal 205 having a series of pulses at a particular data rate, in which the "after-shock" (e.g., ringing) from each pulse can interfere with successive pulses (i.e., causing ISI); and the equalizer subsystem 140 can output an output signal 235 free of (or substantially free of) those effects.

To fully adapt, embodiments of the equalizer subsystem 140 include weighted feedback controls, which can be implemented as "tap weights" 250. For example, the tap weights 250 can be adjusted to manipulate the weighting of the forward filter 210 and/or the feedback filter 230, for example, to meet a predetermined criterion (e.g., to converge on an optimization solution). The adaptation can typically cause the data eye to be opened to some fully adapted level. In some implementations, the tap weights 250 are implemented as digital controls that can each be adjusted to a set of discrete values, or "codes." For example, the tap weights 250 can include eight taps, each having 31 possible codes, permitting settings spanning from "–15" to "+15." Any suitable number of taps with any suitable number of codes can be used.

As described with reference to FIG. 1, embodiments can include one or more vertical margin analyzers 160. The vertical margin analyzer 160 shown in FIG. 2 includes a tap adjustment subsystem 260, an error measurement subsystem 270, and a vertical margin calculation subsystem 280. The vertical margin analyzer 160 can controllably close the data eye of a receiver system until an I/O error threshold is exceeded, and can output a vertical margin measurement 285 for the receiver system as a function of the amount of data eye closure.

Figure 3:
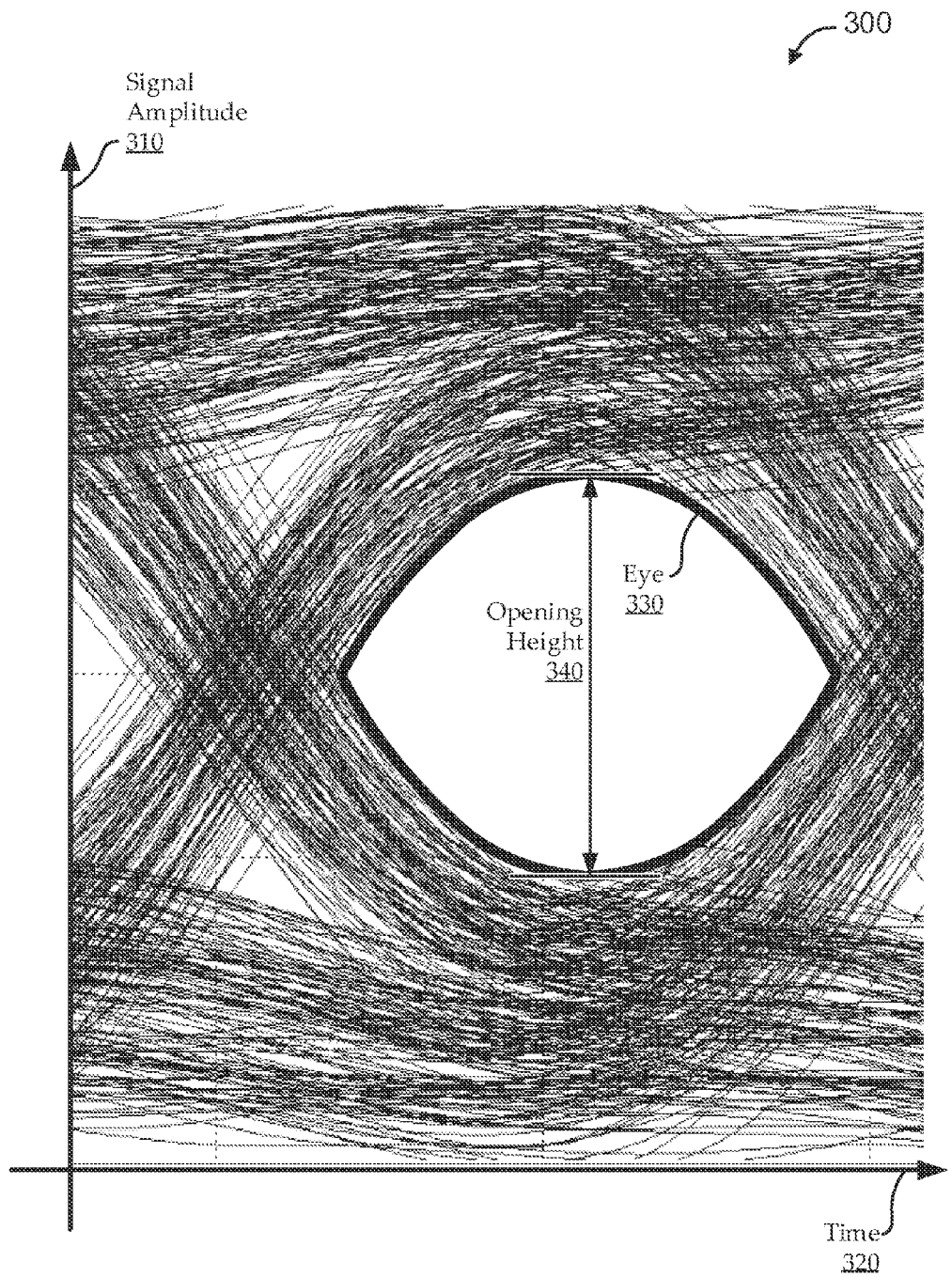
FIG. 3 shows an illustrative data eye as an oscilloscope plot of signal amplitude on the y-axis and time on the x-axis.

In some implementations, prior to determining the link margin for a particular data channel, the equalizer subsystem 140 can be left to adapt to its receiver system's data channel. The adaptation can effectively open the data eye for the channel to a fully adjusted level. For example, turning to FIG. 3, an illustrative data eye 330 is shown as an oscilloscope plot 300 of signal amplitude 310 on the y-axis and time 320 on the x-axis. For example, the output of the channel's receiver system (e.g., the output signal 235 of the equalizer subsystem 140 of FIG. 2) can be sampled repetitively and applied to the vertical input, with the horizontal sweep triggered by the data rate of the input signal 205 (of FIG. 2), so that each data transition (e.g., voltage changes representing a transition from '1' to '0', from '1' to '1', from '0' to '1', or from '0' to '0') is effectively plotted on top of preceding transitions. As the receiver system does a better job of adapting to ISI (and/or other channel characteristics), the transitions become more distinguishable (e.g., '1' becomes more distinguishable from '0'), and the opening height 340 of the data eye 330 increases to a fully adapted level.

Figure 4:
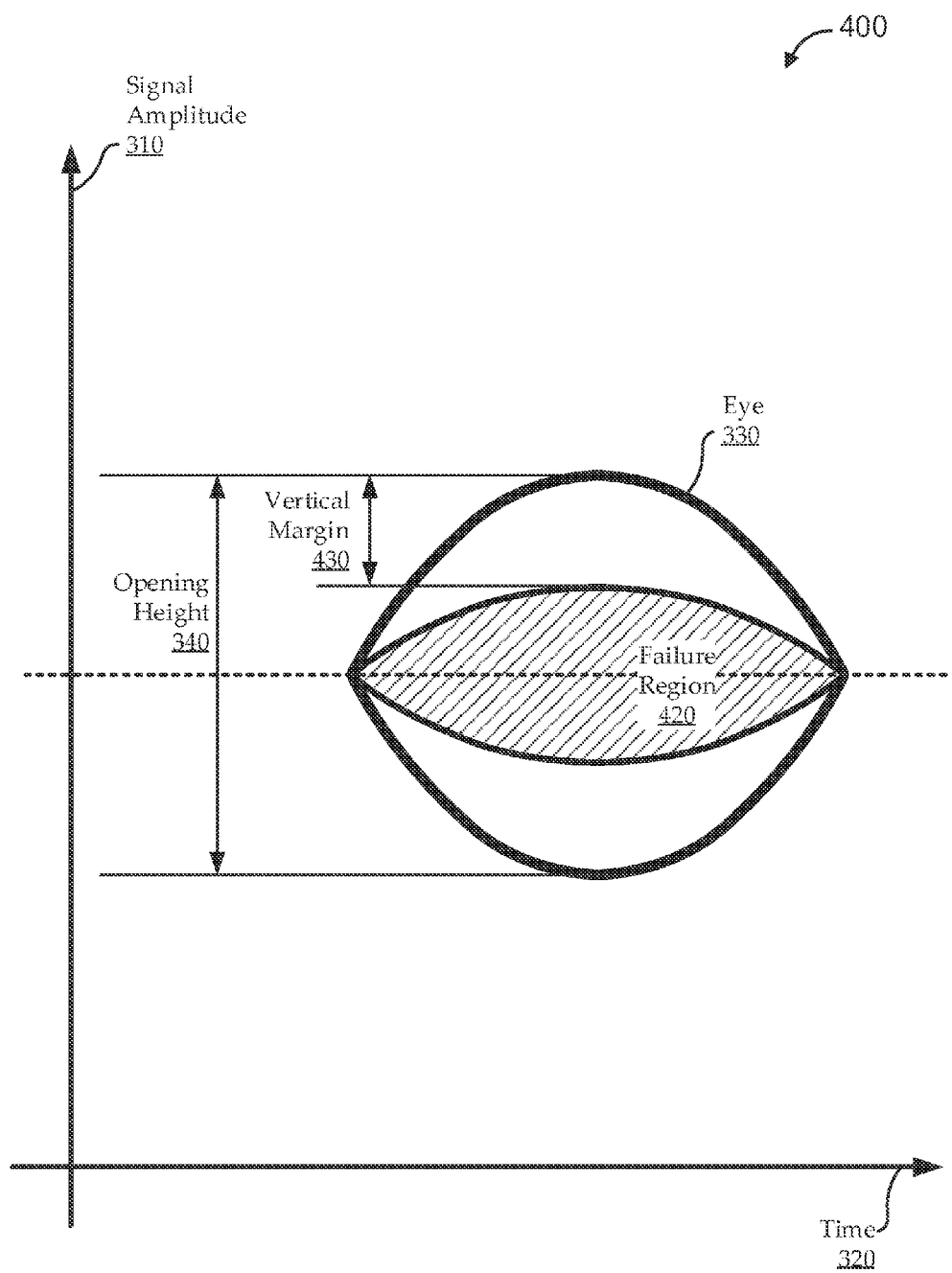
FIG. 4 shows a simplified view of a data eye as it relates to link margin, according to various embodiments.

FIG. 4 shows a simplified view of a data eye 330 as it relates to link margin, according to various embodiments. As described with reference to FIG. 3, the data eye 330 is shown as an oscilloscope plot 400 of signal amplitude 310 versus time 320. An illustrative opening height 340 is shown for the data eye 330 at a fully adapted level. As the receiver system (e.g., its equalizer system) moves away from a fully adapted state, more I/O errors can be experienced by the channel, which can manifest as closure of the data eye (i.e., a decrease in the opening height 340). Typically, an I/O environment, like the communications system 100 of FIG. 1, is designed to tolerate a threshold amount of I/O error. For example, a particular channel (or all channels) can be specified to have a bit error rate of no more than ten bit errors in twenty seconds of communication (e.g., at 18 Gigabits per second, that would yield a bit error rate of approximately 10 errors per 360 billion bits). An increase in the I/O errors in excess of the threshold can manifest as a data eye 330 with less than a minimum opening height 340 (illustrated as failure region 420). It is noted that, while the failure region is shown simply as a reduction in opening height 340, there could be other changes to the shape of the data eye 330 in such a condition, such as the horizontal width of the data eye 330 can shrink, etc. The difference between the fully adjusted opening height 340 and the height of the failure region 420 can be considered as the vertical eye margin 430 for the channel. The vertical eye margin 430 can either be considered directly as the link margin for the channel, or can be used directly to calculate a link margin value for the channel.

Returning to FIG. 2, embodiments of the vertical margin analyzer 160 can determine the link margin for the channel by forcing the data eye 330 to close to its failure region 420 to determine its vertical eye margin 430. As described above, when the equalizer subsystem 140 is allowed to fully adapt to the channel characteristics (e.g., ISI), the equalizer subsystem 140 will adjust its tap weights 250 to effectuate that adaptation. For example, a DFE is typically designed to sample the data eye 330 at multiple tap locations (e.g., a particular pulse occurs at cursor location h(0), and the tap locations can be at post-cursor locations h(1), h(2), . . . h(n), for n taps). The sampled information from those locations can indicate the impact of a pulse on subsequent pulses. The filtering effects of the equalizer subsystem 140 (e.g., implemented by the forward filter 210 and feedback filter 230) can typically be adjusted at each tap location by changing corresponding weighting applied to the filters at those tap locations. For example, for each of taps 1 . . . N (e.g., 1-10), there is an associated, independently adjustable code representing weighting values from w . . . W (e.g., −15 to +15). The equalizer subsystem 140 (e.g., DFE) can feedback the sampled information to determine how best to adapt to eliminate ISI in the receiver by adjusting the weighting applied to the filters for each of those tap locations (i.e., the tap weights 250). Movement of the tap weights 250 toward fully adapted values can yield a reduction in I/O error (which can manifest as opening of the data eye 330), and movement away from those fully adapted values can yield an increase in I/O error (which can manifest as closing of the data eye 330).

Embodiments of the tap adjustment subsystem 260 can manipulate the tap weights 250 of the equalizer system 140 away from their fully adapted values, thereby forcing the data eye 330 to close. It has been demonstrated that a certain change in tap weights 250 has a deterministic impact on data eye 330 closure. Accordingly, the extent to which the tap weights 250 change can be used to calculate a resulting change in opening height 340 for the data eye 330.

In general, implementations of the tap adjustment subsystem 260 can adjust the tap weights 250 according to an adjustment protocol 265. The adjustment protocol 265 can manipulate the tap weights 250 in many ways. Some implementations adjust the tap weights 250 by a certain number of weighting levels (e.g., codes, etc.) in each of a number of iterations. For example, the tap weight 250 associated with a particular tap location can be increased by three levels in each iteration until it reaches its maximum level, then the tap weight 250 associated with the next tap location can be increased by three levels in each iteration until it reaches its maximum level, and so on. Other implementations adjust the tap weights 250 according to the deterministic mathematical correspondence between the adjustment in tap weights 250 and the extent of data eye 330 closure. For example, the tap weights 250 can be adjusted to effect a five-millivolt closure of the data eye 330 in each iteration. In some implementations, the adjustment protocol 265 can define a different adjustment for each iteration.

The tap weights 250 can be manipulated in any suitable order, for example, sequentially (e.g., manipulate the weighing for tap 1, then for tap 2, then for tap 3, etc.), randomly, etc. In one implementation, the tap weights 250 for the first two taps (or any suitable number of taps) are not manipulated by the tap adjustment subsystem 260. For example, manipulating the tap weights 250 at the first tap locations can adversely impact other receiver system functions, such as clock data recovery. The tap weights 250 can also be manipulated in any suitable direction, for example, by increasing tap weights 250 for all tap locations that are manipulated, by decreasing tap weights 250 for all tap locations that are manipulated, by alternating between increasing and decreasing tap weights 250 for all tap locations that are manipulated, by "opposite-side" adjusting tap weights 250 for all tap locations that are manipulated (e.g., if the fully adapted value is "+3", the adjustment can be in the negative direction; if the fully adapted value is "−5", the adjustment can be in the positive direction; etc.), by randomly choosing adjustment directions for the tap weights 250 for all tap locations that are manipulated, etc. Adjustment of the weighting of a particular tap weight 250 can impact its neighbors, so the selection of adjustment direction, order, etc. can change how those adjustments impact the data eye 330. In some implementations, all tap weights 250 are adjusted in the same direction, which has been demonstrated to yield more consistent results in many environments (e.g., due to certain second and/or third order effects).

Typically, the adjustment protocol 265 defines iterative adjustments (which may or may not be consistent for each iteration). After each adjustment iteration, embodiments of the error measurement subsystem 270 in the vertical margin analyzer 160 can test the channel to determine whether the amount of I/O error in the channel has exceeded some error threshold 263. The error threshold 263 can be defined per channel, for all channels, etc. The channel can be tested in any suitable manner. In some embodiments, the error measurement subsystem 270 can inject a deterministic (e.g., stored, calculated, or otherwise predictably generated) set of bits into the channel to be received by the receiver system as channel test data 275. For example, the channel test data 275 can be injected at the transmitter-side of the channel, at the receiver-side of the channel, etc. Though the channel test data 275 is described as being "injected" by the vertical margin analyzer 160, certain embodiments implement the injecting by directing the transmitter systems 105 to communicate channel test data 275 that is generated and/or stored by the transmitter systems 105 themselves. For example, the error measurement subsystem 270 can inject the channel test data 275 by triggering the transmitter systems 105 to communicate a sequence of bits already known to the transmitter systems 105 (and to the receiver systems 110). In some implementations, the channel test data 275 can include a large number of bits (e.g., twenty seconds worth of communications, one hundred billion bits, etc.). Testing a longer string of bits can yield a more precise bit error rate, but the longer string can also take longer to communicate and process through the receiver system. Accordingly, the number of bits of the channel test data 275 can be selected to balance measurement precision versus measurement speed.

The receiver system can attempt to recover the bit data by adapting to the channel, etc., such that a corresponding input signal 205 is received by the equalizer subsystem 140, and the equalizer subsystem 140 generates a corresponding output signal 235. If the equalizer subsystem 140 is allowed to fully adapt, it is expected that the bit data of the output signal 235 will match the channel test data 275 perfectly (or, at least, that there are fewer errors than allowed by the error threshold 263). As the tap adjustment subsystem 260 manipulates the tap weights 250 away from their fully adapted levels, it is expected that recovered bit data in the output signal 235 will differ from the channel test data 275 (i.e., the error rate will increase), albeit typically by a small amount (e.g., around one error in tens or hundreds of billions of bits).

Embodiments can iteratively use the tap adjustment subsystem 260 to adjust the tap weights 250 according to the adjustment protocol 265, each time using the error measurement subsystem 270 to determine whether the error rate has exceeded the error threshold 263 for the channel. As described with reference to FIG. 4, exceeding the error threshold 263 can indicate that the data eye 330 has closed to a respective failure region 420 for the channel. When the tap weights 250 have been adjusted to a degree that the error threshold 263 has been exceeded, embodiments of the vertical margin calculation subsystem 280 in the vertical margin analyzer 160 can calculate a vertical margin measurement 285 for the channel. The vertical margin calculation subsystem 280 can determine what amount of adjustment in tap weights 250 were applied by the tap adjustment subsystem 260 to cause the channel to go from a fully adjusted level to a level that exceeded its error threshold 263. The tap adjustment subsystem 260 can then exploit the deterministic mathematical correspondence between the adjustment in tap weights 250 and the extent of data eye 330 closure to calculate an amount of data eye 330 closure that occurred over the course of the adjustment iterations (i.e., the vertical margin measurement 285 for the channel). The vertical margin measurement 285 can be considered as the link margin, or can be used to calculate the link margin for the channel.

The amount and manner of adjustment of the tap weights 250 in each iteration, as defined by the adjustment protocol 265, can impact the accuracy of the link margin determination. For example, if the error threshold 263 is determined to have been exceeded after an adjustment iteration, it may not be clear to what extent the error threshold 263 has been exceeded, except with respect to the maximum possible impact of the adjustment iteration. Accordingly, smaller adjustments per iteration can yield a more precise calculation of link margin for each channel. However, using smaller adjustments per iteration can typically result in each link margin determination involving larger numbers of iterations (i.e., more time). As such, the adjustment protocol 265 can be designed to balance the trade-off between measurement precision and measurement time in the link margin determinations. For example, in a fairly stable communications system having thousands of I/O channels, it may be desirable to have faster, less precise link margin determinations; and the adjustment protocol 265 can be designed for more impactful adjustment iterations (so that fewer iterations will be needed on average to perform each link margin determination).

The various systems, subsystems, and components described above can be implemented in any suitable manner, and the various operations of methods and functions of certain system components can be performed by any suitable means capable of performing the corresponding functions. For example, various functions described with reference to a particular subsystem or component can be performed by a different component, a combination of components, and/or in any other suitable manner. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 5:
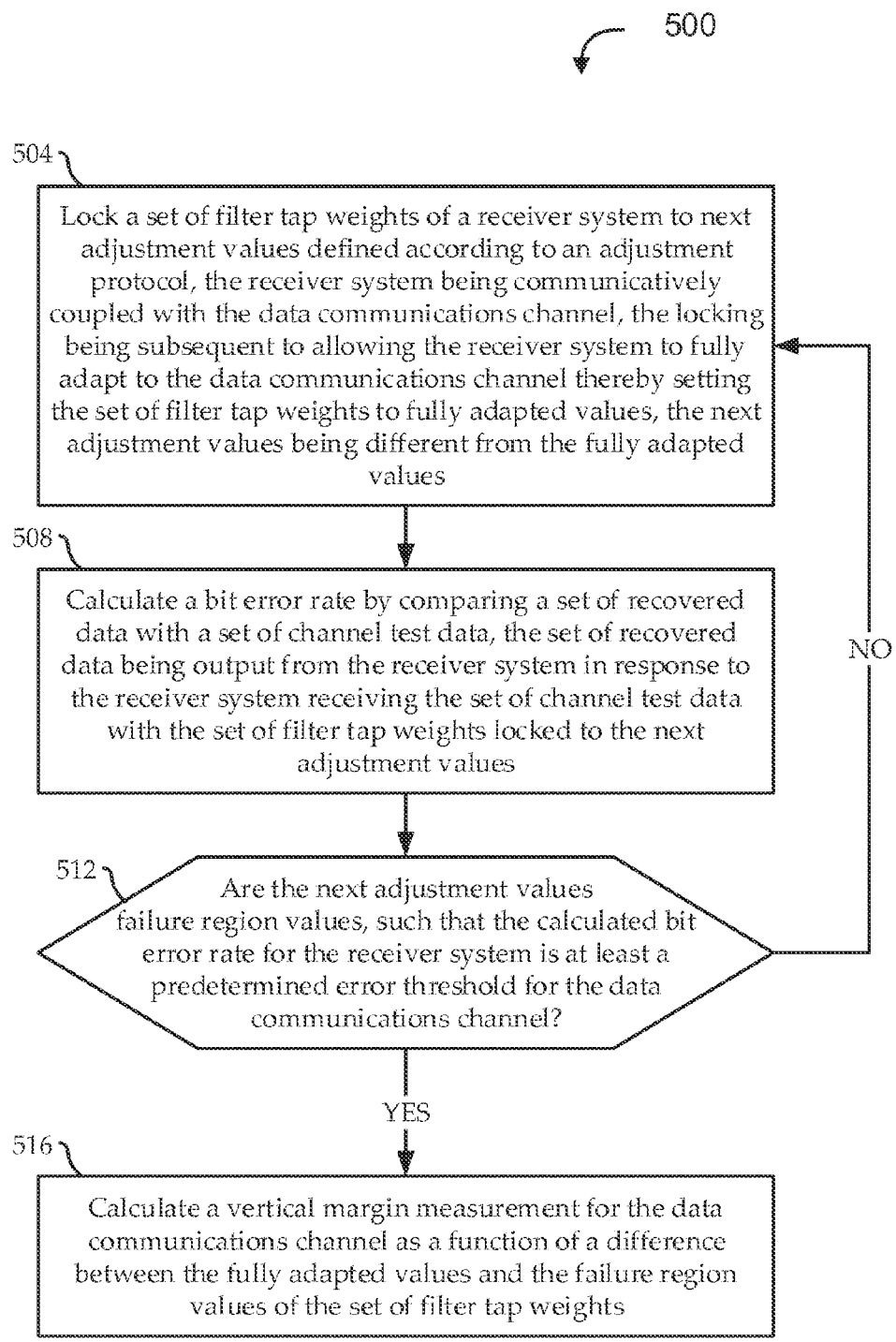
FIG. 5 shows a flow diagram of an illustrative method for determining link margin of a data communications channel, according to various embodiments.

FIG. 5 shows a flow diagram of an illustrative method 500 for determining link margin of a data communications channel, according to various embodiments. Embodiments of the method 500 can begin at stage 504 by locking a set of filter tap weights of a receiver system to next adjustment values defined according to an adjustment protocol. As described above, the receiver system can be communicatively coupled with a data communications channel. Prior to the locking, the receiver system can be allowed to fully adapt to its data communications channel (e.g., by allowing adaptation without locking any filter tap weights), thereby setting the set of filter tap weights to fully adapted values. The next adjustment values can be determined (per iteration) according to an adjustment protocol, as described above.

At stage 508, a bit error rate can be calculated by comparing a set of recovered data with a set of channel test data. For example, as described above, a deterministic set of channel test data can be injected into the data channel in a manner that causes it to be received by the receiver system (e.g., by its DFE). The receiver system attempts to adapt to the channel to recover the injected test data with some of its tap weights being locked according to stage 504 (i.e., the receiver system can only partially adapt, because some of its filter weights are locked). The receiver system outputs the set of recovered data according to its partial adaptation, such that the set of recovered data may include some errors (e.g., due to ISI that could not be eliminated by the receiver system in its partially locked condition).

At stage 512, a determination can be made as to whether the next adjustment values are failure region values, such that the calculated bit error rate for the receiver system (from stage 508) is at least a predetermined error threshold for the data communications channel. For example, the partial adaptation of the receiver circuit can result in bit errors between the injected test data and the recovered data. The next adjustment values can be considered failure region values when the rate of bit errors is more than a predetermined acceptable maximum rate for the particular channel. If the next adjustment values are not determined to be failure region values at stage 512, the method 500 can perform another iteration of stages 504 and 508.

If the next adjustment values are determined to be failure region values at stage 512, a vertical margin measurement can be derived for the data communications channel at stage 516 as a function of a difference between the fully adapted values and the failure region values of the set of filter tap weights. For example, the change in filter tap weights can have a deterministic mathematical correspondence with a change in the vertical opening height of the data eye for the channel. That change in vertical opening height of the data eye can be considered as the link margin for the channel (or can be used to derive the link margin).

Figure 6:
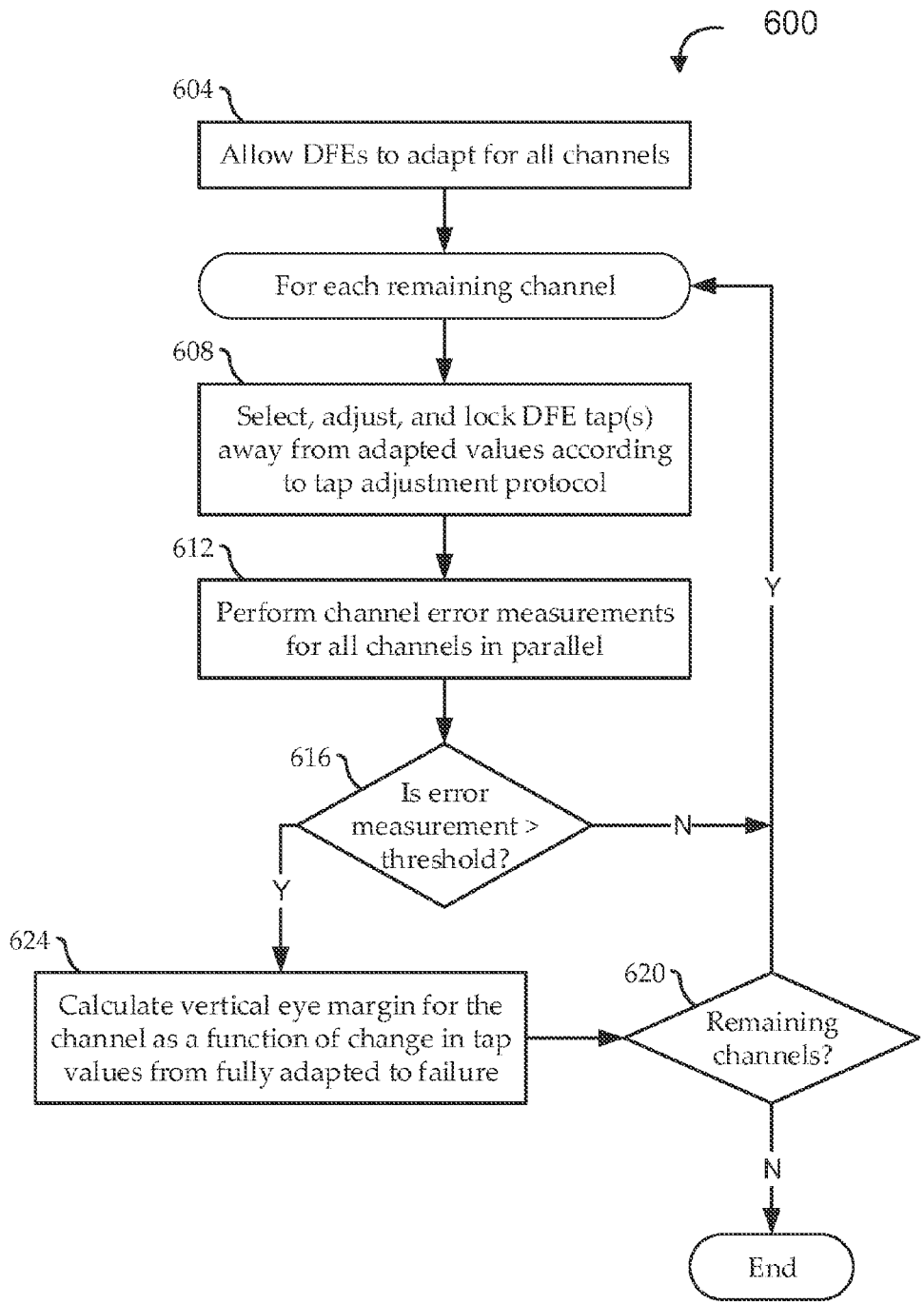
FIG. 6 shows a flow diagram of another illustrative method for determining link margin across a number of data communications channels, according to various embodiments.

FIG. 6 shows a flow diagram of another illustrative method 600 for determining link margin across a number of data communications channels, according to various embodiments. Embodiments of the method 600 are described in context of a communications system having multiple channels, each in communication with a respective receiver system that includes a decision feedback equalizer (DFE). The method 600 can begin at stage 604 by allowing the DFEs to fully adapt to their respective channels. As described above, this can cause filter tap weights for the DFEs to become set to fully adapted values.

The method 600 can iteratively close the data eye for the channels until respective failure regions are identified. In some implementations, as a failure region is identified for each channel, the channel can be removed from the next iteration. Accordingly, the iterations are illustrated as occurring for "each remaining channel." At stage 608 embodiments can select, adjust, and lock one or more DFE taps away from their adapted weighting values according to a tap adjustment protocol. Various types of tap adjustment techniques are described above. For example, taps can be adjusted, in sequence, by a certain number of codes, to effect a certain deterministic closure of the data eye, etc. The tap weights can be locked to prevent the DFE from changing their values during a next adaptation.

At stage 612, channel error measurements can be performed for all channels in parallel. For example, a vertical margin analyzer can inject deterministic channel test data into each receiver system's data path and receive recovered data from the outputs of each receiver system. The injected data and the recovered data can be compared to determine a bit error rate for the receiver. Notably, the locking of certain taps in the DFE in stage 608 can prevent the DFE from fully adapting, which can result in bit errors. In various implementations, the injected channel test data can be the same or different for each channel. Using a centralized approach allows the error measurements to be performed in parallel for all the channels, which can appreciably save measurement time. For example, if twenty seconds worth of data are used for the measurement, and there are one thousand channels; a series approach would take more than twenty-thousand seconds (i.e., more than 5.5 hours), while a parallel approach could take close to twenty seconds. The adjustment and locking in stage 608 can be performed in series or in parallel for some or all of the receiver systems. For example, performing stage 608 in series for all receiver systems can take a very small amount of time in comparison to the time taken by the measurement step in stage 612.

At stage 616, a determination can be made as to whether the calculated bit error rates exceed a respective error threshold for each channel. For example, each channel can respond differently to each tap adjustment, so that some may reach a failure region before others. If the calculated bit error rates exceed a respective error threshold for a particular channel (or for multiple or all channels), a vertical eye margin can be calculated for the channel(s) at stage 624 as a function of the change in tap values from their fully adapted values to their failure region values. Once a vertical eye margin has been calculated for a particular channel at stage 624, that channel can be removed from the set of channels being measured. Thus, a further determination can be made at stage 620 as to whether channels remain for which a link margin determination has not yet been made. If not, the method 600 can end. If so, and/or if the calculated bit error rates in stage 616 do not exceed respective error thresholds for any channels, the method 600 can iterate back to stage 608 to make further tap weight adjustments (e.g., for the remaining channels).

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for determining a link margin of a data communications channel, the system comprising:
    an error measurement subsystem that operates to:
        inject a set of channel test data into a receiver system communicatively coupled with the data communications channel;
        receive a set of recovered data output from the receiver system in response to receiving the set of channel test data; and
        calculate a bit error rate by comparing the set of recovered data with the set of channel test data;
    a tap adjustment subsystem that operates to adjust a set of filter tap weights of the receiver system from fully adapted values to failure region values, the fully adapted values of the set of filter tap weights corresponding to when the receiver system is fully adapted to the data communications channel, and the failure region values of the set of filter tap weights corresponding to when the calculated bit error rate for the receiver system is exceeding a predetermined error threshold for the data communications channel; and
    a vertical margin calculation subsystem that operates to calculate a vertical margin measurement for the data communications channel as a function of a difference between the fully adapted values and the failure region values of the set of filter tap weights.

2. The system of claim 1, wherein:
    the tap adjustment subsystem operates to adjust the set of filter tap weights iteratively, so that adjusting from the fully adapted values to the failure region values occurs over a plurality of adjustment iterations; and
    the error measurement subsystem operates to calculate the bit error rate subsequent to each iteration to determine whether the calculated bit error rate for the receiver system is exceeding the predetermined error threshold for the data communications channel.

3. The system of claim 1, wherein the tap adjustment subsystem operates to adjust the set of filter tap weights by adjusting at least one of the set of filter tap weights by an amount defined by an adjustment protocol.

4. The system of claim 1, wherein the tap adjustment subsystem operates to adjust the set of filter tap weights by:
    converting a degree of data eye closure defined by an adjustment protocol to a degree of adjustment to the set of filter tap weights as a function of a deterministic mathematical correspondence between the degree of data eye closure and the degree of adjustment to the set of filter tap weights; and
    adjusting at least one of the set of filter tap weights by the degree of adjustment.

5. The system of claim 1, further comprising:
    a plurality of receiver systems, each communicatively coupled with a respective one of a plurality of data communications channels, and each having an equalization subsystem that is communicatively coupled with the tap adjustment subsystem.

6. The system of claim 5, wherein:
    the tap adjustment subsystem operates to adjust the set of filter tap weights iteratively, so that adjusting from the fully adapted values to the failure region values occurs over a plurality of adjustment iterations; and
    subsequent to each iteration, the error measurement subsystem operates to inject the set of channel test data into the plurality of receiver systems in parallel, receive the set of recovered data output from the plurality of receiver systems in parallel, and calculate the respective bit error rates for each of the plurality of receiver systems in parallel.

7. The system of claim 6, wherein:
    the tap adjustment subsystem operates to adjust the set of filter tap weights in parallel for at least some of the plurality of the receiver systems during at least some of the adjustment iterations.

8. The system of claim 5, further comprising:
    a plurality of transmitter systems, each communicatively coupled with a respective one of the plurality of data communications channels.

9. The system of claim 1, further comprising:
    a plurality of receiver systems, each communicatively coupled with a respective one of a plurality of data communications channels, and each comprising an instance of the tap adjustment subsystem.

10. The system of claim 1, wherein the receiver system comprises a decision feedback equalization (DFE) subsystem that controls an impact of filtering of the DFE subsystem at each of a set of tap locations according to an associated one of the set of filter tap weights.

11. A method for determining a link margin of a data communications channel, the system comprising:
    locking a set of filter tap weights of a receiver system to next adjustment values defined according to an adjustment protocol, the receiver system being communicatively coupled with the data communications channel, the locking being subsequent to allowing the receiver system to fully adapt to the data communications channel thereby setting the set of filter tap weights to fully adapted values, the next adjustment values being different from the fully adapted values;
    calculating a bit error rate by comparing a set of recovered data with a set of channel test data, the set of recovered data being output from the receiver system in response to the receiver system receiving the set of channel test data with the set of filter tap weights locked to the next adjustment values;
    iterating the locking and the calculating steps until the next adjustment values are failure region values, such that the calculated bit error rate for the receiver system is at least a predetermined error threshold for the data communications channel; and
    deriving a vertical margin measurement for the data communications channel as a function of a difference between the fully adapted values and the failure region values of the set of filter tap weights.

12. The method of claim 11, wherein:
    the locking, calculating, iterating, and deriving steps are performed by a vertical margin analyzer; and
    the receiver system is one of a plurality of receiver systems, each communicatively coupled with a respective one of a plurality of data communications channels, and each having an equalization subsystem that is communicatively coupled with the vertical margin analyzer.

13. The method of claim 12, wherein:
    the vertical margin analyzer performs the calculating in parallel for at least some of the plurality of the receiver systems between each iterating step.

14. The method of claim 13, wherein:
    the vertical margin analyzer performs the locking in parallel for at least some of the plurality of the receiver systems between each iterating step.

15. The method of claim 11, wherein:
    the locking, calculating, iterating, and deriving steps are performed by a vertical margin analyzer; and the receiver system is one of a plurality of receiver systems, each communicatively coupled with a respective one of a plurality of data communications channels, and each comprising an instance of the vertical margin analyzer.

16. The method of claim 11, wherein:

the receiver system comprises a filter configured to have an impact applied at each of a plurality of tap locations; and each of the set of filter tap weights controls the impact applied at a respective one of the plurality of tap locations.

17. The method of claim 11, wherein the locking comprises:

determining, according to the adjustment protocol, which one or more of the filter tap weights to adjust and by what amount to adjust the one or more filter tap weights;

adjusting the one or more filter tap weights according to the determining; and locking the set of filter tap weights during the calculating.

18. The method of claim 17, wherein the determining comprises:

determining a degree of data eye closure defined by an adjustment protocol;

converting the degree of data eye closure to a determination of which one or more of the filter tap weights to adjust and by what amount to adjust the one or more filter tap weights as a function of a deterministic mathematical correspondence there-between.

19. An input/output communications system, the system comprising:

a plurality of data communications channels;

a plurality of receiver systems that each operates to receive data signals over a respective one of the data communications channels coupled thereto, each receiver system comprising an equalizer subsystem; and a vertical margin analyzer, communicatively coupled with the equalizer subsystem of each receiver system, and comprising:

an error measurement subsystem that operates to inject a set of channel test data into a receiver system communicatively coupled with the data communications channel, receive a set of recovered data output from the receiver system in response to receiving the set of channel test data, and calculate a bit error rate by comparing the set of recovered data with the set of channel test data;

a tap adjustment subsystem that operates to adjust a set of filter tap weights of the receiver system from fully adapted values to failure region values, the fully adapted values of the set of filter tap weights corresponding to when the receiver system is fully adapted to the data communications channel, and the failure region values of the set of filter tap weights corresponding to when the calculated bit error rate for the receiver system is exceeding a predetermined error threshold for the data communications channel; and a vertical margin calculation subsystem that operates to calculate a vertical margin measurement for the data communications channel as a function of a difference between the fully adapted values and the failure region values of the set of filter tap weights.

20. The system of claim 19, wherein:

the tap adjustment subsystem operates to adjust the set of filter tap weights iteratively, so that adjusting from the fully adapted values to the failure region values occurs over a plurality of adjustment iterations; and subsequent to each iteration, the error measurement subsystem operates to inject the set of channel test data into the plurality of receiver systems in parallel, receive the set of recovered data output from the plurality of receiver systems in parallel, and calculate the respective bit error rates for each of the plurality of receiver systems in parallel.

* * * * *